US010025658B2

(12) United States Patent
Ihara et al.

(10) Patent No.: US 10,025,658 B2
(45) Date of Patent: Jul. 17, 2018

(54) RISK EVALUATION SYSTEM FOR PROCESS SYSTEM, RISK EVALUATION PROGRAM AND RISK EVALUATION METHOD

(71) Applicant: TLV Co., Ltd., Kakogawa (JP)

(72) Inventors: Kenta Ihara, Kakogawa (JP); Yoshio Miyamae, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 109 days.

(21) Appl. No.: 15/300,909

(22) PCT Filed: Mar. 31, 2015

(86) PCT No.: PCT/JP2015/060293
§ 371 (c)(1),
(2) Date: Sep. 30, 2016

(87) PCT Pub. No.: WO2015/152317
PCT Pub. Date: Oct. 8, 2015

(65) Prior Publication Data
US 2017/0024267 A1    Jan. 26, 2017

(30) Foreign Application Priority Data
Apr. 1, 2014    (JP) ................. 2014-075095

(51) Int. Cl.
*G06F 11/07*    (2006.01)
*G05B 23/02*    (2006.01)

(52) U.S. Cl.
CPC ........ *G06F 11/079* (2013.01); *G05B 23/0251* (2013.01); *G05B 23/0283* (2013.01); *G06F 11/0721* (2013.01)

(58) Field of Classification Search
CPC .................... G06F 11/079; G05B 23/0251
USPC ................................................ 714/47.3
See application file for complete search history.

(56) References Cited

U.S. PATENT DOCUMENTS

| 2005/0228622 A1 | 10/2005 | Jacobi |
| 2006/0241927 A1 | 10/2006 | Kadambe et al. |
| 2007/0067142 A1 | 3/2007 | Kavaklioglu et al. |

(Continued)

FOREIGN PATENT DOCUMENTS

| JP | 2002123314 A | 4/2002 |
| JP | 2004227298 A | 8/2004 |

(Continued)

*Primary Examiner* — Kamini B Patel
(74) *Attorney, Agent, or Firm* — The Webb Law Firm

(57) ABSTRACT

A risk evaluation system includes a storage unit, an operation unit, a calculation unit, a risk evaluation unit and a display unit. The calculation unit calculates first and second factors for use in risk evaluation relating to specific constituent devices on the basis of predetermined information about the specific constituent devices. The risk evaluation unit generates risk evaluation information to be used for displaying a device risk evaluation matrix defined by two axes of the first factor and the second factor and including plot images plotted based on the first and second factors of the specific constituent devices. Further, the risk evaluation unit generates the device risk evaluation information in identifiable displaying mode to allow identification of plot images of specific constituent devices constituting a same process.

10 Claims, 10 Drawing Sheets

(56) References Cited

U.S. PATENT DOCUMENTS

| | | | |
|---|---|---|---|
| 2008/0077457 A1* | 3/2008 | Pannatier | G06Q 10/0631 705/7.12 |
| 2008/0140576 A1* | 6/2008 | Lewis | G06Q 10/0635 705/67 |
| 2009/0024429 A1 | 1/2009 | Jones et al. | |
| 2011/0295561 A1* | 12/2011 | Nagase | G05B 19/4183 702/188 |
| 2012/0011590 A1* | 1/2012 | Donovan | H04L 63/1408 726/25 |
| 2012/0180133 A1* | 7/2012 | Al-Harbi | H04L 63/1433 726/25 |
| 2013/0298230 A1* | 11/2013 | Kumar | G06F 21/52 726/22 |
| 2014/0164290 A1* | 6/2014 | Salter | G06Q 40/06 705/36 R |
| 2014/0317019 A1* | 10/2014 | Papenbrock | G06Q 40/06 705/36 R |
| 2015/0178647 A1* | 6/2015 | Wiggins | G06Q 10/0635 705/7.28 |
| 2016/0171415 A1* | 6/2016 | Yampolskiy | H04L 63/1433 705/7.28 |

FOREIGN PATENT DOCUMENTS

| | | |
|---|---|---|
| JP | 200920787 A | 1/2009 |
| JP | 201073121 A | 4/2010 |
| JP | 2010146186 A | 7/2010 |
| JP | 201361695 A | 4/2013 |
| JP | 201388828 A | 5/2013 |
| WO | 2013060522 A1 | 5/2013 |

\* cited by examiner importance table

| evaluation information ID | text data |
|---|---|
| T1 | loss amount of product |
| T2 | pressure factor |
| T3 | risk of catching fire・explosion |
| T4 | toxicity |
| T5 | influence on production process |
| T6 | position of system |
| T7 | time required for restoration |
| T8 | influence of human・environment |
| T9 | maintenance management system |

Fig.5B occurrence frequency table 81

| evaluation information ID | text data |
|---|---|
| S1 | present state (deterioration situation) |
| S2 | risk of period trouble occurrence |
| S3 | effectiveness of inspection |
| S4 | frequency of shutdown |
| S5 | safety of operation |
| S6 | severity of operation |
| S7 | repair history |

Fig.5C option table (S1) 82

| evaluation information ID | text data | numerical value data |
|---|---|---|
| S1 | large | XX |
|  | medium | YY |
|  | small | ZZ |

Fig.6A device risk evaluation table 90

| device ID | importance (horizontal axis coordinate) | occurrence frequency (vertical axis coordinate) | process ID |
|---|---|---|---|
| XXXX-XXXX1 | ... | ... | YYYY-YYY3 |
| XXXX-XXXX2 | ... | ... | YYYY-YYY3 |
| XXXX-XXXX3 | ... | ... | YYYY-YYY3 |
| ⋮ | ⋮ | ⋮ | ⋮ |
| XXXX-XXXXX | ... | ... | YYYY-YY55 | process risk evaluation table 91

| device ID | importance (horizontal axis coordinate) | occurrence frequency (vertical axis coordinate) |
|---|---|---|
| YYYY-YYY1 | ... | ... |
| YYYY-YYY2 | ... | ... |
| YYYY-YYY3 | ... | ... |
| ⋮ | ⋮ | ⋮ |
| YYYY-YYY4 | ... | ... | device risk evaluation table

| device ID | importance (horizontal axis coordinate) | occurrence frequency (vertical axis coordinate) | operational state | process ID |
|---|---|---|---|---|
| XXXX-XXXX1 | ... | ... | normal | YYYY-YYY3 |
| XXXX-XXXX2 | ... | ... | normal | YYYY-YYY3 |
| XXXX-XXXX3 | ... | ... | paused | YYYY-YYY3 |
| ⋮ | ⋮ | ⋮ | ⋮ | ⋮ |
| XXXX-XXXXX | ... | ... | abnormal | YYYY-YY55 |

RISK EVALUATION SYSTEM FOR PROCESS SYSTEM, RISK EVALUATION PROGRAM AND RISK EVALUATION METHOD

CROSS-REFERENCE TO RELATED APPLICATIONS

This application is the United States national phase of International Application No. PCT/JP2015/060293 filed Mar. 31, 2015, and claims priority to Japanese Patent Application No. 2014-075095 filed Apr. 1, 2014, the disclosures of which are hereby incorporated in their entirety by reference.

TECHNICAL FIELD

This invention relates to a risk evaluation system for a process system constituted of a plurality of processes, and relates also to a risk evaluation program and a risk evaluation method for the same.

BACKGROUND ART

In recent years, in a plant (a process system) such as a power plant, an oil producing apparatus, an oil refinery, a gas plant, a chemical plant, etc., as a method of efficiently implementing maintenance management activities while ensuring reliability and safety, a risk evaluation technique using RBI (Risk-Based Inspection) has been introduced. In this technique, for each one of a plurality of processes constituting the plant, risk evaluation is made based on frequency of occurrence of trouble (failure, etc.) and importance of the process. For instance, by effecting e.g. maintenance in a concentrated manner on a constituent device constituting the process which is evaluated as having high risk, the process system is maintained and managed in an efficient manner. Such risk evaluation technique is disclosed in Japanese Unexamined Patent Application Publication No. 2013-088828 and Japanese Unexamined Patent Application Publication No. 2010-073121, for instance.

Aside from the above, though not being risk evaluation, there is also known a method of collecting present operating states (state data) of steam traps as constituent devices installed in the above-described plant or the like and implementing a maintenance thereof such as replacement of a steam trap based on the state data. Such method is disclosed in Japanese Unexamined Patent Application Publication No. 2010-146186.

BACKGROUND ART DOCUMENTS

Patent Documents

Patent Document 1: Japanese Unexamined Patent Application Publication No. 2013-088828
Patent Document 2: Japanese Unexamined Patent Application Publication No. 2010-073121
Patent Document 3: Japanese Unexamined Patent Application Publication No. 2010-146186

SUMMARY OF THE INVENTION

Problem to be Solved by Invention

The above-described risk evaluation technique is implemented in the unit of process (or in the unit of device). Therefore, in the risk evaluation, it is difficult to grasp relevance between the process and the constituent device(s) constituting the process. For example, in the case of risk evaluation in the unit of process, of the constituent devices of a process that have high risk, it is difficult to grasp which constituent device has higher risk than the others. Thus, it is difficult to determine from which constituent device the maintenance should be effected with priority.

In the field of risk evaluation, the object of the present invention is to provide a risk evaluation system, a risk evaluation program and a risk evaluation method for a process system that allow grasping of relevance between a process constituting a process system and constituent devices constituting the process.

Solution

According to a first aspect of the present invention, there is provided a risk evaluation system for a process system constituted of a plurality of processes, the system comprising a storage unit, an operation unit, a calculation unit, a risk evaluation unit and a display unit. The storage unit stores relevance information that correlates identification information for identifying the respective process with identification information for identifying at least a specific constituent device among constituent devices constituting the process. The operation unit receives an operational input of predetermined information for risk evaluation relating to the specific constituent device. The calculation unit calculates first and second factors for use in risk evaluation relating to the specific constituent device on the basis of the predetermined information about the specific constituent device. The risk evaluation unit generates device risk evaluation information to be used for displaying a device risk evaluation matrix defined by two axes of the first factor and the second factor and including a plot image plotted based on the first and second factors of the specific constituent device. The display unit displays the device risk evaluation matrix with using the risk evaluation information. Further, the risk evaluation unit generates the device risk evaluation information in identifiable displaying mode to allow identification of the plot image of the specific constituent device constituting a same process based on the relevance information stored in the storage unit.

The first factor can be importance of the specific constituent device in the process and the second factor can be frequency of occurrence of a trouble in the specific constituent device.

The risk evaluation unit can generate the risk evaluation information in a displaying mode that surrounds the plot images of the specific constituent devices constituting the same process with a line as the identifiable displaying mode.

The operation unit can further receive an operational input of predetermined information for risk evaluation relating to the process. The calculation unit calculates the first and second factors of the process, based on the predetermined information relating to the process. The risk evaluation unit can generate process risk evaluation information for displaying a process risk evaluation matrix defined by two axes of the first factor and the second factor and including plot images plotted based on the calculated first and second factors of the process. The display unit can display the device risk evaluation matrix and the process risk evaluation matrix either selectively or together in juxtaposition with each other.

The storage unit can store information of an operating state of the specific constituent device in correlation to the identification information of the specific constituent device.

The risk evaluation unit can generate device risk evaluation information for displaying a device risk evaluation matrix including plot images in a displaying mode allowing identification of an operating state of each of the specific constituent devices, based on the information of the operating state of the specific constituent devices.

The displaying mode of the plot image can be such that one of shape, color, blinking interval is made different according to the operating state.

The specific constituent device can comprise a steam trap for discharging drain generated in the process system, and the operating state can be a state determined based on information regarding temperature and vibration of the steam trap.

The operating state of the specific constituent device can include a normal state indicating an appropriate operating state, an abnormal state indicating an abnormal operating state and a paused state indicating pausing of operation.

According to a second aspect of the present invention, there is provided a risk evaluation program for a computer to be applied to a process system constituting of a plurality of processes, wherein:

the computer causes the program to function as:
a calculation unit that calculates first and second factors for use in risk evaluation relating to at least a specific constituent device among constituent devices constituting the process on the basis of predetermined information for risk evaluation about the specific constituent device, the predetermined information being inputted by a user via an operation unit; and
a risk evaluation unit that generates device risk evaluation information to be used for causing a display unit to display a device risk evaluation matrix defined by two axes of the first factor and the second factor and including a plot image plotted based on the first and second factors of the specific constituent devices; and
wherein the risk evaluation unit is caused to generate the device risk evaluation information in identifiable displaying mode to allow identification of plot image of the specific constituent device constituting a same process, based on relevance information correlating identification information for identifying the process and identification information for identifying the specific constituent device.

According to a third aspect of the present invention, there is provided a risk evaluation method for a process system constituting of a plurality of processes executed by a computer, the method comprising:

an accessing step for accessing a storage unit that stores relevance information that correlates identification information for identifying the respective process with identification information for identifying at least specific constituent device among constituent devices constituting the process;

an operating step for receiving an operational input of predetermined information for risk evaluation relating to the specific constituent device;

a calculating step for calculating first and second factors for use in risk evaluation relating to the specific constituent device on the basis of predetermined information about the specific constituent device;

a risk evaluating step for generating risk evaluation information to be used for displaying a device risk evaluation matrix defined by two axes of the first factor and the second factor and including plot images plotted based on calculated importance and trouble occurrence frequency of the specific constituent device; and a displaying step for displaying the device risk evaluation matrix with using the risk evaluation information;

wherein the risk evaluating step generates the device risk evaluation information in identifiable displaying mode to allow identification of the plot image of the specific constituent device constituting a same process based on the relevance information stored in the storage unit.

Effect of Invention

With this invention, in the device risk evaluation matrix, a plot image of specific constituent device constituting a same process can be identified. Thus, relevance between a process constituting a process system and a constituent device constituting the process can be grasped. Consequently, the maintenance and management of a process system can be effected in a more efficient manner.

BRIEF DESCRIPTION OF THE DRAWINGS

FIG. 5B is a view showing an example of frequency occurrence table relating to the first embodiment of the present invention, FIG. 5C is a view showing an example of option table relating to the first embodiment of the present invention, FIG. 6A is a view showing a device risk evaluation table stored in a storage section relating to the first embodiment of the present invention.

EMBODIMENTS

With reference to the accompanying drawings, a risk evaluation system for a process system, a risk evaluation program and a risk evaluation method as embodiments of the present invention will be explained. Incidentally, it is understood that the present invention is not limited to these embodiments. Further, the order of each operation constituting each kind of flow to be explained next can be changed as desired as long as no conflicts or the like occur in the contents of the operation.

Figure 1:
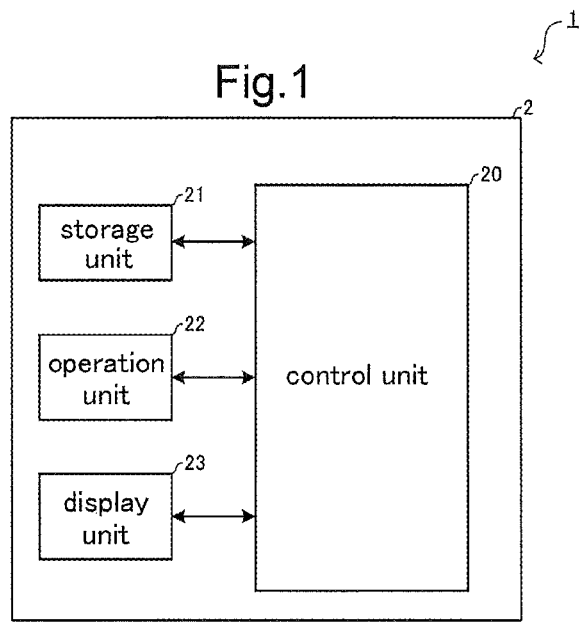
FIG. 1 is a view showing a configuration of a risk evaluation system for a process system relating to a first embodiment of the present invention.

First Embodiment 1-1: Configuration of Risk Evaluation System 1 for Process System (Plant):

FIG. 1 is a view showing a configuration of a risk evaluation system 1 for a process system. The risk evaluation system 1 consists of a terminal device 2, etc. and executes risk evaluation of a plant (a process system) such as a power plant, an oil producing apparatus, an oil refinery, a gas plant, a steam plant and so on. In this embodiment, as an example of risk evaluation of the process system, there will be explained risk evaluation of processes and constituent devices of a steam plant. The "processes" refer to a steam supplying process and on, and it is one of a plurality of divisions of the steam plant in the unit of process. The "constituent devices" refer to such devices as steam traps constituting each process. In this embodiment, there will be explained risk evaluation of steam traps ("specific constituent devices") as an example of constituent devices. The steam traps discharge drain generated in each process. Further, as a risk evaluation method, an evaluation method of RBI (Risk-Based Inspection) is employed. RBI is a known technique in the art, thus detailed explanation thereof will be omitted herein.

The terminal device 2 comprises a portable personal computer, a tablet type terminal having a touch panel, etc. This is used for effecting risk evaluation of the process system. For effecting the above-described risk evaluation, the terminal device 2 includes a control unit 20, a storage unit 21, an operation unit 22, a display unit 23 etc. The control unit 20 can be a CPU, etc. and executes a risk evaluation program stored in the storage unit 21 to effect the risk evaluation. The storage unit 21 can be a hard disc, a RAM, etc. and stores the above-described risk evaluation program and risk evaluation tables to be described later.

The operation unit 22 comprises e.g. a keyboard, a mouse, a touch panel, etc. and receives an operation input of predetermined information for effecting the risk evaluation and transmits the inputted information to the control unit 20. The display unit 23 comprises a monitor such as a liquid crystal display and displays e.g. an image of a window 30 (see FIG. 2A and FIG. 2B) or the like. Incidentally, in this embodiment, the storage unit 21, the operation unit 22 and the display unit 23 are integrally provided in the terminal device 22, but these can be provided separately also.

1-2: Risk Evaluation

Figure 2A:
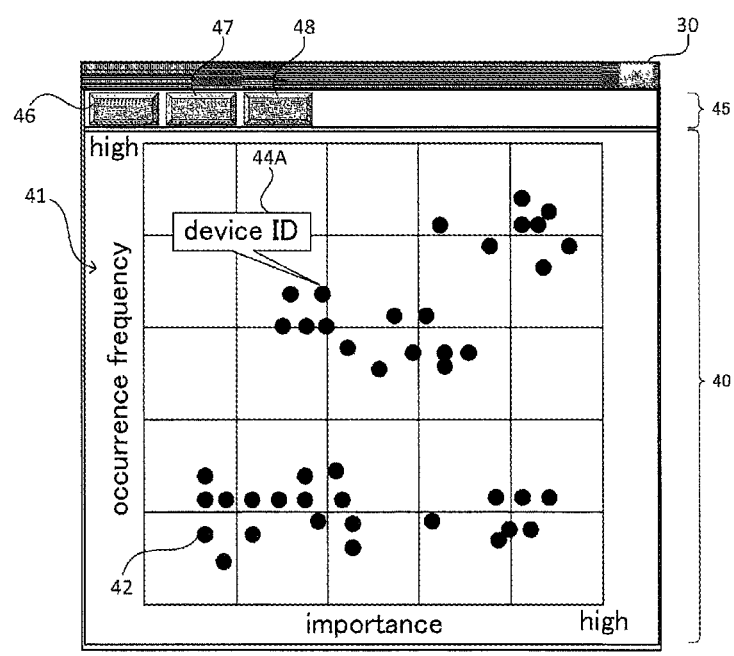
FIG. 2A is a view showing one example of a window displaying risks of steam traps relating to the first embodiment of the present invention.
Figure 2B:
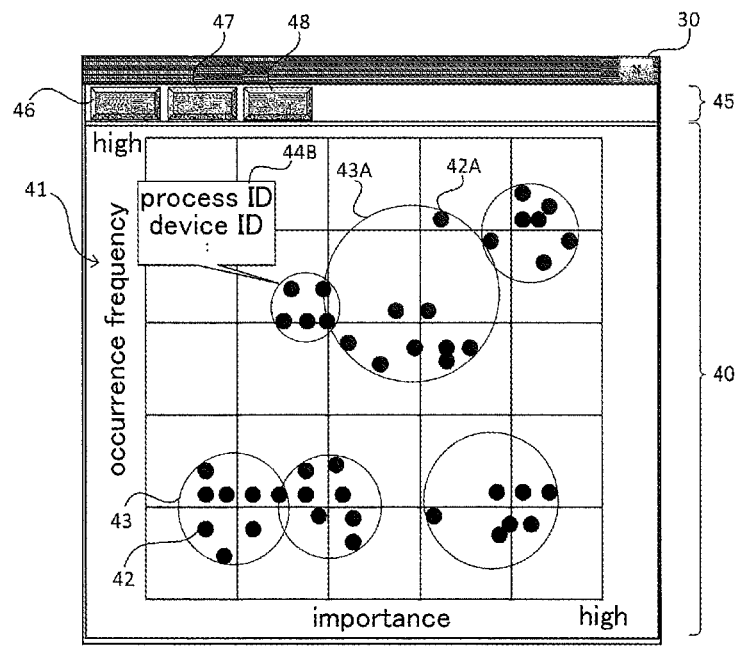
FIG. 2B is a view showing one example of a window displaying risks of steam traps relating to the first embodiment of the present invention.
Figure 3:
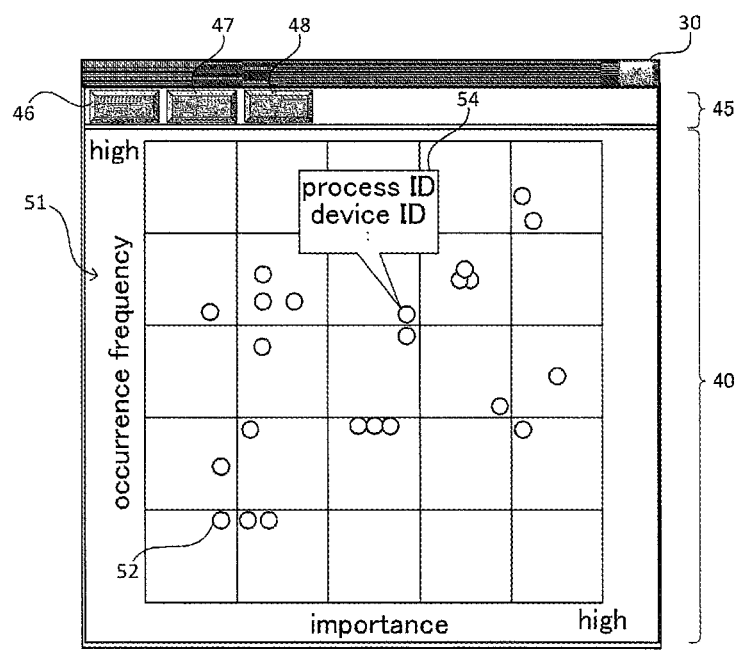
FIG. 3 is a view showing an example of a window displaying risks of processes relating to the first embodiment of the present invention.

FIG. 2A is a view showing one example of the window 30 displaying risks of steam traps. The window 30 constituted of a matrix displaying area 40, an operation icon displaying area 45, etc. and is displayed on the display unit 23. In the matrix displaying area 40, there is displayed a device risk evaluation matrix 41 in the form of coordinate system defined by a horizontal axis representing importance and a vertical axis representing occurrence frequency of trouble. In the operation icon displaying area 45, as shown in FIG. 2A, FIG. 2B and FIG. 3, there are provided operation button icons 46, 47, 48 for receiving inputs for switching over a displaying mode of the matrix displaying area 40.

The device risk evaluation matrix 41 is divided into 5×5 cells, in which plot images 42 are plotted. Each plot image 42 is plotted according to importance and trouble occurrence frequency of a steam trap corresponding thereto. Namely, each plot image 42 shows "risk" of the corresponding steam trap. The "importance" represents magnitude of damage that will occur in the case of trouble occurrence. The "trouble occurrence frequency" represents likelihood of trouble occurrence such as a damage. The "risk" is determined by the "product" of these factors, i.e. "importance" and "trouble occurrence frequency". That is, the nearer the origin (left lower side) a cell is, the lower the risk. The farther from the origin (right upper side) a cell is, the higher the risk. Thus, from this device risk evaluation matrix 14, an operator can grasp the risk of each steam trap.

Further, when the operator designates one of the plot images 42 by operating (e.g. touching) the operation unit 22, as shown in FIG. 2A, a device identification (device ID) corresponding to the touched plot image 42 is displayed in a balloon image 44A. This device ID is a unique identification information that specifies a constituent device constituting a process.

Displaying of the above-described device risk evaluation matrix 14 is started in response to an operator's pressing the operation button icon 46 by operating (e.g. touching) the operation unit 22, after activation of the window 30. Also, if the operator presses the operation button icon 47, the displaying mode of the device risk evaluation matrix 41 is changed from the one shown in FIG. 2A to one shown in FIG. 2B. In this device risk evaluation matrix 41 shown in FIG. 2B, there are shown a plurality of process circles 43 (including a process circle 43A) each surrounding plot images 42 of the steam traps together constituting a same process.

By displaying the process circles 43 as shown in FIG. 2B, it is possible to identify the plot images 42 (including the plot image 42A) of a same process. Also, based on the position of the process circle 43, approximate risk of that process can be grasped. For instance, the operator can realize that of the steam traps (plot images 42) constituting the process circle 43A, the risk is particularly high with the steam trap corresponding to the plot image 42A. Therefore, the operator can judge that maintenance or the like should be effected with priority on the steam trap corresponding to this plot image 42A. And, if the risk of this steam trap corresponding to the plot image 42A can be lowered, the risk of the process circuit 43A too is lowered.

Further, in case the operator designates one of the process circles 43 by operating (e.g. touching) the operation unit 22, as shown in FIG. 2B, the process ID corresponding to this designated process circle 43 and the device ID's of the steam traps constituting this process are displayed in the balloon image 44B. Incidentally, the process ID is unique identification information that specifies a process constituting the process system.

Incidentally, under the state illustrated in FIG. 2B, if the operator presses the operation button icon 27, the device risk evaluation matrix 41 is returned to the displaying mode shown in FIG. 2A. Further, under the state illustrated in FIG. 2A and the state illustrated in FIG. 2B, if the operator presses the operation button icon 28, in the matrix displaying area 40 shown in FIG. 3, a process risk evaluation matrix 51 will be displayed with switching.

FIG. 3 is a view showing an example of the window 30 displaying risks of processes. In the window 30 displayed in FIG. 3, similarly to the device risk evaluation matrix 41 described above, there is displayed a process risk evaluation matrix 51 in the form of coordinate system defined by a horizontal axis representing importance and a vertical axis representing trouble occurrence frequency. In this process risk evaluation matrix 51, plot images 52 are plotted. The plot image 52 too, like the plot image 42, is plotted according to importance and trouble occurrence frequency of the process corresponding thereto. With this, the operator can grasp risk of respective process.

Further, if the operator designates one of the plot images 52 by operating (e.g. touching) the operation unit 22, as shown in FIG. 3, the process ID of the process corresponding to this designated plot image 52 and the device ID of the steam trap constituting this process are displayed in a balloon image 54. Incidentally, the above-described risk evaluation matrices 41, 51 shown in FIG. 2A, FIG. 2B and FIG. 3 are displayed by a known image processing technique, so detailed explanation thereof is omitted herein.

Figures 4, 5A:
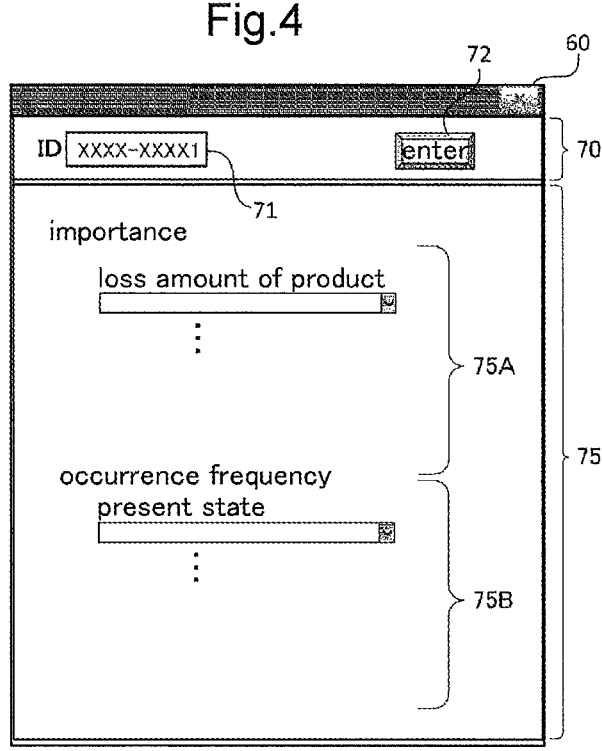
FIG. 4 is a view showing an example of a window displaying input screen of predetermined information for calculation of importance and occurrence frequency of steam traps and processes relating to the first embodiment of the present invention.
FIG. 5A is a view showing an example of importance table relating to the first embodiment of the present invention.

Next, the predetermined information for calculations of importance and trouble occurrence frequency of steam trap and process will be explained with reference to FIG. 4. FIG. 4 is a view showing an example of a window 60 displaying input screen of predetermined information for calculation of importance and occurrence frequency of steam trap and process.

The window 60 consists of an ID input area 70 and an information input area 75 (including information input areas 75A, 75B) and so on. In the ID input area 70, there are provided an input window 71 and an operational button icon 72. The input window 71 receives input of a steam trap ID information (device ID) and input of an ID information (process ID) uniquely assigned to a process. The operational button icon 72 receives an input of entrance (decision) of input of information in the information input area 75.

In the information input area 75A, there is provided an input window for inputting predetermined information for calculation of importance. In the information input area 75B, there is provided an input window for inputting predetermined information for calculation of trouble occurrence frequency. The contents of the predetermined information to be inputted in the information input areas 75A, 75B can be information shown in FIG. 5A and FIG. 5B, for instance. FIG. 5A shows one example of an importance table 80. FIG. 5B shows one example of an occurrence frequency table 81.

In each table 80, 81, text data indicating the information contents for the calculations of the importance and the trouble occurrence frequency are stored in correlation with evaluation information ID. The evaluation information ID is unique identification information for specifying each predetermined information. The text data is displayed at an upper section of the corresponding input window of the information input area 75A, 75B. For example, the operator will select a matching content from a plurality of options displayed in a pull down menu of the input window for each predetermined information, thereby to effect input of the information relating to the steam trap (or process) inputted to the input window 71. As a numerical value is assigned to each option, each predetermined information is converted into a numeral value based on a selected option. For instance, "present condition (deterioration situation)" of evaluation information ID: S1 has three levels of option as shown in FIG. 5C, with numerical values being assigned to these options.

FIG. 5C shows an example of option table 82 in which text data and numerical value data are correlated to evaluation information ID. The text data comprise options to be displayed as a pull-down menu. The numerical value data represent numerical values of the respective options. And, such option table 82 is stored for each predetermined information (evaluation information ID) in the storage unit 21.

In this way, with using a numerical value converted based on contents of predetermined information inputted by the operator, values of importance and trouble occurrence frequency will be calculated by a calculation formula shown below for instance.

$$\text{importance}=K \cdot T1 \cdot T2 + T3 \cdot T6 + T4 + T5 + T7 + T8 + T9 (K \text{ is a constant}).$$

$$\text{occurrence frequency}=S2 \cdot \Sigma(Si); i=1,3\sim 7$$

Incidentally, the above-described information and calculation formula for the risk evaluation calculation are for use in the risk evaluation of RBI which per se is known. Thus, detailed explanation thereof will be omitted herein. Further, it is understood that the predetermined information and the calculation formula are not limited to those described above, but can be any predetermined information and a calculation formula for calculation of a first factor and a second factor defined by the horizontal axis and the vertical axis of the risk evaluation matrix. For instance, the first factor and the second factor can be "influence" and "trouble occurrence frequency" that are disclosed in Japanese Patent Application Publication No. 2013-88828.

The control unit 20 executes calculation of importance and occurrence frequency for the device ID (or process ID) inputted to the input window 71, based on an operator's pressing the operational button icon 72 shown in FIG. 4, in accordance with the contents inputted to the information input area 75. Then, the control unit 20 sets the calculated importance and trouble occurrence frequency in risk evaluation tables 90, 91 (see FIG. 6A and FIG. 6B) stored in the storage unit 21. Incidentally, the timing of calculation of importance described above can be any time before the risk evaluation matrices 41, 51 are displayed, thus being not particularly limited.

Figures 6B, 7:
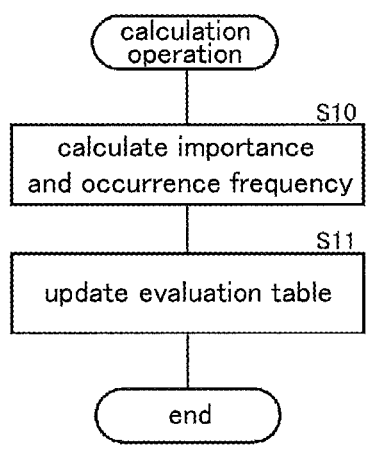
FIG. 6B is a view showing a process risk evaluation table stored in the storage unit relating to the first embodiment of the present invention.
FIG. 7 is a flowchart showing a calculation operation of importance and occurrence frequency executed by the risk evaluation system relating to the first embodiment of the present invention.

FIG. 6A is a view showing the device risk evaluation table 90 stored in the storage unit 21. FIG. 6B is a view showing the process risk evaluation table 91 stored in the storage unit 21. The device risk evaluation table 90 registers therein importances and trouble occurrence frequencies calculated as above for the respective steam traps in correlation with the device ID's corresponding to the respective steam traps. These importances and trouble occurrence frequencies in the device risk evaluation table 90 are numerical value data and also horizontal axis coordinate values and vertical axis coordinate values of the coordinate system of the device risk evaluation matrix 41. The control unit 20 plots the plot images 42 in the device risk evaluation matrix 41, based on these importances and trouble occurrence frequencies.

Further, the device risk evaluation table 90 includes also the process ID's of the processes constituted by the steam traps. Then, based on the process ID information, the control unit 20 identifies steam traps that constitute a same process and calculates a process circle 43 (center coordinates and radius) of this process. Further, based on the position coordinates of the window 30 designated by the operator, the control unit 20 effects displaying of the balloon images 44A, 44B shown in FIG. 2A and FIG. 2B from the respective information in the device risk evaluation table 90 and the above-described process circle 43 (the center coordinates and radius).

In the process risk evaluation table 91 shown in FIG. 6B, similarly to the above-described device risk evaluation table 90, there are registered importances and trouble occurrence frequencies respecting the respective processes. Then, based on these importances and trouble occurrence frequencies, the control unit 20 plots the plot images 52 in the process risk evaluation matrix 51. Further, the control unit 20, based on the position coordinates of the window 30 designated by the operator, effects displaying of the balloon image 54 shown in FIG. 3 from the respective information in the process risk evaluation table 91.

Incidentally, the device ID's and the process ID's in the device risk evaluation table 90 are included in what is referred to as "relevance information" in this invention. Also, the device risk evaluation table 90 and the center coordinates and radius of the process circle 43 are included in what is referred to as "device risk evaluation information" in the present invention. In addition, the device risk evaluation information includes the information for displaying the device risk evaluation matrix 41 such as the plot images 42. Further, the process risk evaluation table 91 is included in the "process risk evaluation information" in the present invention. The process risk evaluation information includes also the information for displaying the process risk evaluation matrix 51 such as the plot images 52. Incidentally, the image information such as the plot images 42, 52, the operational button icons 46-48, 72 to be displayed in the above-described windows 30, 60 are stored in the storage unit 21.

1-3: Flowchart

FIG. 7 is a flowchart showing a calculation operation of importance and occurrence frequency executed by the risk evaluation system 1. This calculation operation is effected by the terminal device 2 (control unit 20). The operator will operate the operation unit 22 to activate the window 60 and then input various predetermined information and press the operational button icon 73. In response to this, the execution is initiated.

The control unit 20 obtains numeral values corresponding to contents of the various information firstly inputted by the operator from the option table 82 and then calculates importance and trouble occurrence frequency with using these numerical values (step S10). Next, the control unit 20 sets the information such as the calculated importance in the risk evaluation tables 90, 91 of the corresponding device ID and process ID (step S11), thus completing this operation.

Figure 8:
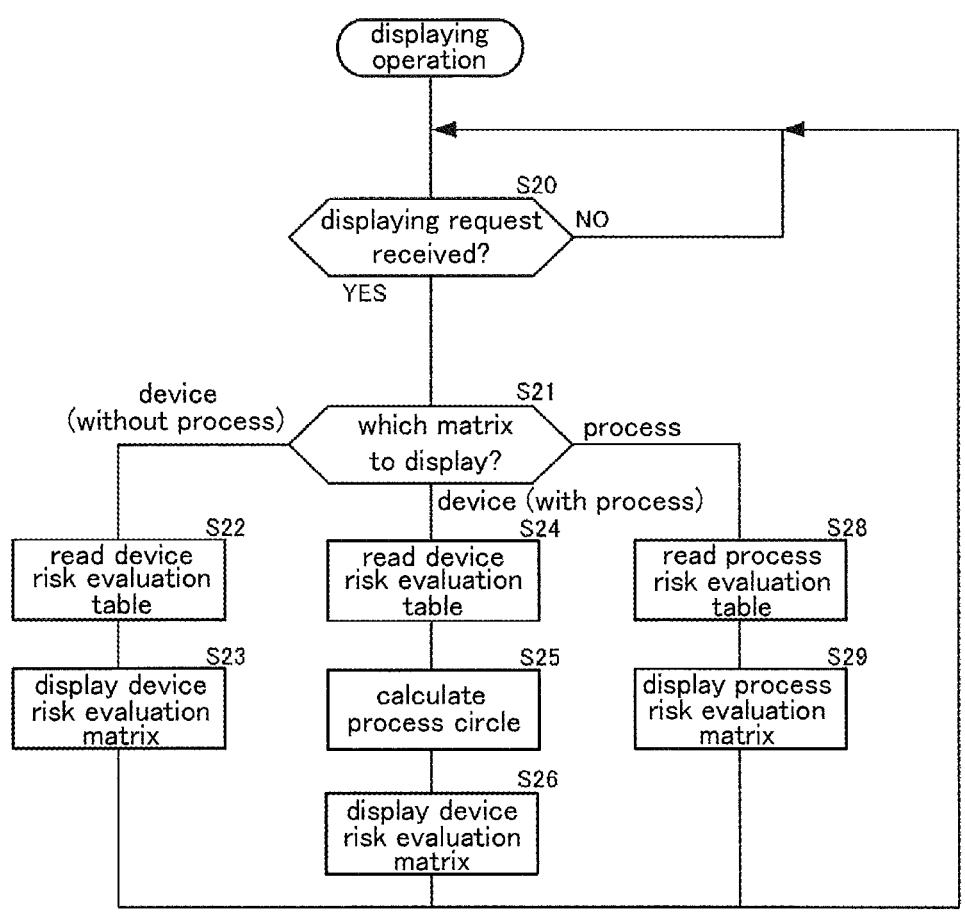
FIG. 8 is a flowchart showing a displaying operation of risk evaluation matrices executed by the risk evaluation system relating to the first embodiment of the present invention.

FIG. 8 is a flowchart showing a displaying operation of the risk evaluation matrices 41, 51 executed by the risk evaluation system 1. This displaying operation is executed by the terminal device 2 (control unit 20). In response to activation of the window 30 by the operator's operation on the operation unit 22, the control unit 20 executes this displaying operation.

The control unit 20 waits until reception of a displaying request (step S20). More particularly, the control unit 20 waits until the operator selects a displaying mode of the matrix displaying area 40 by pressing one of the above-described operational button icons 46-48. When a displaying request is received (step S20: YES), the control unit 20 determines which displaying mode of the matrix displaying area 40 the selected displaying mode is, based on the pressed operational button icon 46-48 (step S21). In case the displaying mode of the device risk evaluation matrix 41 (without process circles 43) is selected (step S21: device (without process)), the control unit 20 reads out the device risk evaluation table 90 from the storage section 21 (step S22). Next, the control unit 20 displays the device risk evaluation matrix 41 such as the one shown in FIG. 2A, based on the device risk evaluation information of this table 90 for instance (step S23). Thereafter, the control unit 20 returns to the operation at step S20.

In case the displaying mode of the device risk evaluation matrix 41 (with process circles 43) is selected (step S21: device (with process)), the control unit 20 reads out the device risk evaluation table 90 from the storage section 21 (step S24). Next, the control unit 20 calculates the center coordinates and radiuses of the process circles 43 based on the information in this table 90 (step S25). For instance, based on the importances (horizontal axis coordinates) and occurrence frequencies (vertical axis coordinates) of all the steam traps constituting the process, the center position of these steam traps can be calculated and this center position can be used as the "center coordinates" of the process circle 43. Further, for instance, of the steam traps, the distance between the steam trap farthest from the center coordinates and the center coordinates can be used as the "radius". Or, the radius can be a value obtained by adding a predetermined value to the above-described distance. With such addition of a predetermined value, it is possible to avoid overlap of the plot images 42 of the steam traps with the circumference of the process circle 43, so that the plot images 42 can be displayed inside the process circle 43. And, based on the device risk evaluation information such as this table 90, the control unit 20 displays the device risk evaluation matrix 41 including the process circle 43 such as the one shown in FIG. 2B (step S26). Thereafter, the control unit 20 returns to the operation at step S20.

Further, in case the displaying mode of the process risk evaluation matrix 51 is selected (step S21: process), the control unit 20 reads out the process risk evaluation table 91 from the storage section 21 (step S28). Then, based on the process risk evaluation information such as this table 91, the control unit 20 displays the process risk evaluation matrix 51 such as the one shown in FIG. 3 (step S29). Thereafter, the control unit 20 returns to the operation at step S20. And, the control unit 20 continues the execution of the above-described displaying operation until the window 30 is closed.

As described above, the risk evaluation system can identify plot images of specific constituent devices (steam traps) constituting a same process in the device risk evaluation matrix. Therefore, in the risk evaluation, relevance between a process constituting a process system and constituent devices constituting the process can be grasped, so that maintenance and management of the process system can be carried out in a more efficient manner.

Second Embodiment

A risk evaluation system 100 of this embodiment effects risk evaluation of a specific constituent device (a steam trap) and a process, like the risk evaluation system 1 of the first embodiment. But, in addition, this risk evaluation system 100, unlike the first embodiment, displays a current operating state of the steam trap in the risk evaluation. Next, features different from the first embodiment will be explained mainly.

2-1: Configuration of Risk Evaluation System 100 for Process System (Plant)

Figure 9:
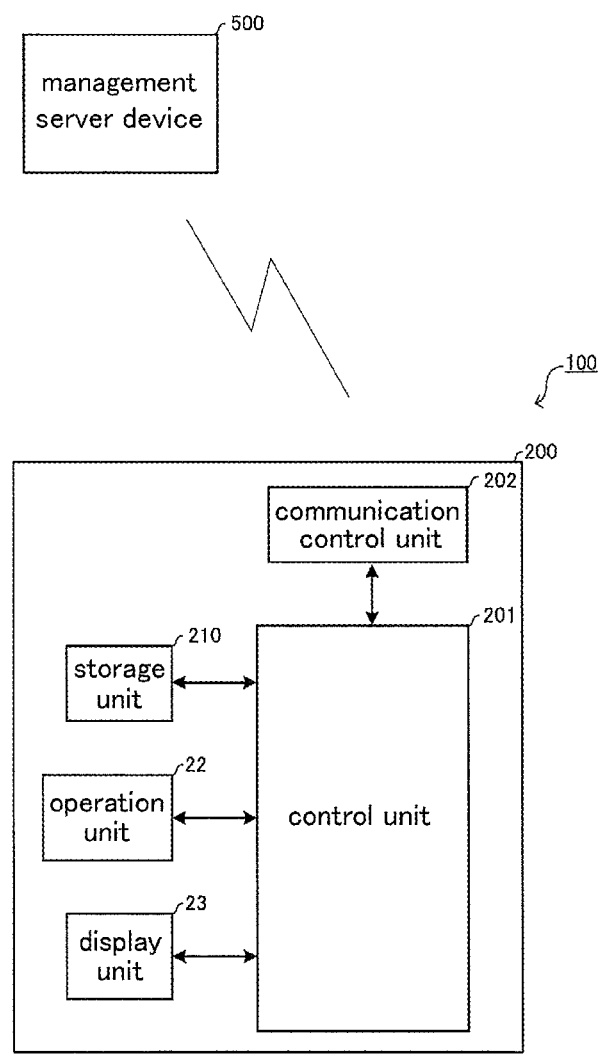
FIG. 9 is a view showing a configuration of a risk evaluation system for a process system relating to a second embodiment of the present invention.

FIG. 9 is a view showing a configuration of the risk evaluation system 100 for a process system. The risk evaluation system 100 consists of a terminal device 200 etc. The terminal device 200 includes a control unit 201, a communication control unit 202, a storage unit 210, the operation unit 22, the storage unit 23, etc.

The control unit 201 is constituted of e.g. a CPU and executes a risk evaluation program stored in the storage unit 210, thus effecting a risk evaluation. Further, in a device risk evaluation, the control unit 201 effects determination of operating states of steam traps and displaying in such a manner that the user can visually check operating states of the steam traps also in a device risk evaluation matrix 410 (see FIG. 10A, FIG. 10B). The communication control unit 202 controls communication with other devices such as a management server device 500, etc. via a network such as the internet. The storage unit 210 is constituted of a hard disc, a RAM, etc. and stores the above-described risk valuation program, risk evaluation tables to be described later, and so on.

2-2: Risk Evaluation

Figure 10A:
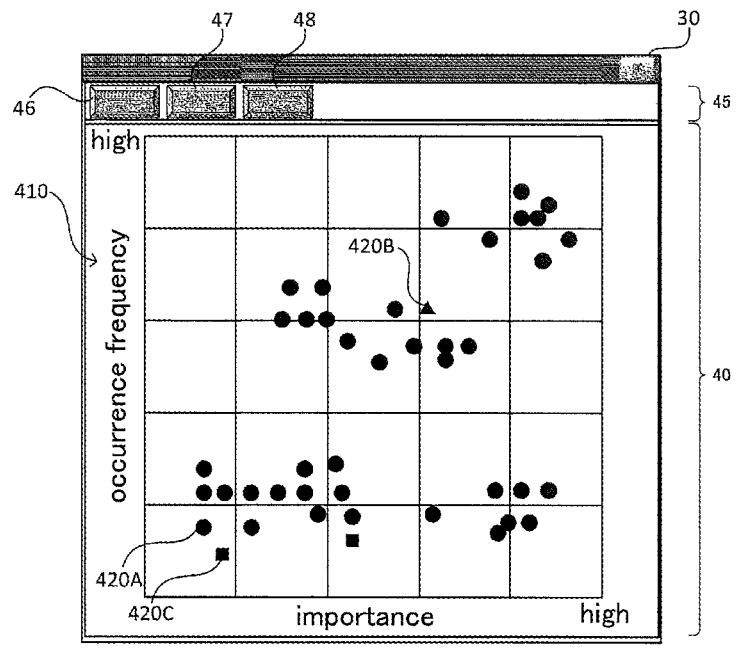
FIG. 10A is a view showing one example of a window displaying risks of steam traps relating to the second embodiment of the present invention.
Figure 10B:
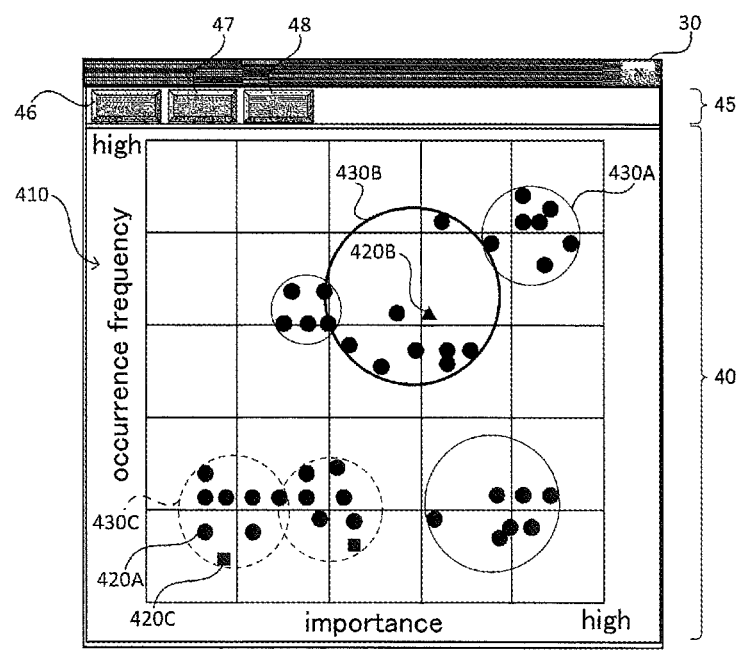
FIG. 10B is a view showing one example of a window displaying risks of steam traps relating to the second embodiment of the present invention.

FIGS. 10A and 10B are views showing one example of a window 30 displaying risks of steam traps relating to the second embodiment of the present invention. The window 30 consists of a matrix displaying area 40 and so on, like the first embodiment. In the matrix displaying area 40, there is displayed a device risk evaluation matrix 410 of coordinate system defined similarly to the first embodiment. Incidentally, FIG. 10A and FIG. 10B show the device risk evaluation matrix 410 for the same steam traps as those in the device risk evaluation matrix shown in FIG. 2A and FIG. 2B of the first embodiment.

In the device risk evaluation matrix 410, plot images 420 (including plot images 420A-420C) are plotted. Each plot image 420 is plotted based on importance of trouble occurrence frequency of the corresponding steam trap, like the first embodiment. Further, the plot images 420 of this embodiment are displayed in different modes (blackened circle, blackened triangle, blackened square) according to operating states of the corresponding steam traps. The blackened circle plot image 420A indicates a normal state in which the corresponding steam trap is under a normal operating state. The blackened triangular plot image 420B indicates an abnormal state in which the corresponding steam trap is under an abnormal state due to a failure or the like. The blackened square plot image 420C indicates a paused state that the corresponding steam trap is stopped. An operation of determining operating state of a steam trap will be described in details later herein. Incidentally, the image data of these plot images 420A-420C are stored in advance in the storage unit 210.

Further, in case the operator presses the operational button icon 47, similarly to the first embodiment, the device risk evaluation matrix 410 is changed from the displaying mode shown in FIG. 10A to the displaying mode shown in FIG. 10B. In the device risk evaluation matrix 410 shown in FIG. 10B, like the first embodiment, there are displayed a plurality of process circles 430 (including the process circles 430A-430C) each surrounding plot images 420 of steam traps constituting a same process.

The process circle 430 of this embodiment is displayed in different displaying modes (thin line, heavy line, broken line) according to operating states of the steam traps constituting a same process. A thin line process circuit 430A indicates that all the steam taps constituting the corresponding process are under normal state. A heavy line process circuit 430B indicates that at least one of the steam traps constituting the corresponding process is under abnormal state. A broken line process circle 430C indicates that at least one of the steam traps constituting the corresponding process is under paused state. Incidentally, in case one process includes both a steam trap under an abnormal state and a steam trap under a paused state, the heavy line process circuit 430B can be displayed advantageously, with placing priority on the abnormal state, for instance.

States of steam traps are stored and managed by a management server device 500 shown in FIG. 1. The terminal device 200 periodically receives operating states of steam traps from the management server device 500 and update a device risk evaluation table 900 shown in FIG. 12. And, the terminal device 200 generates the above-described device risk evaluation matrix 410 based on this evaluation table 900.

Figures 11, 12:
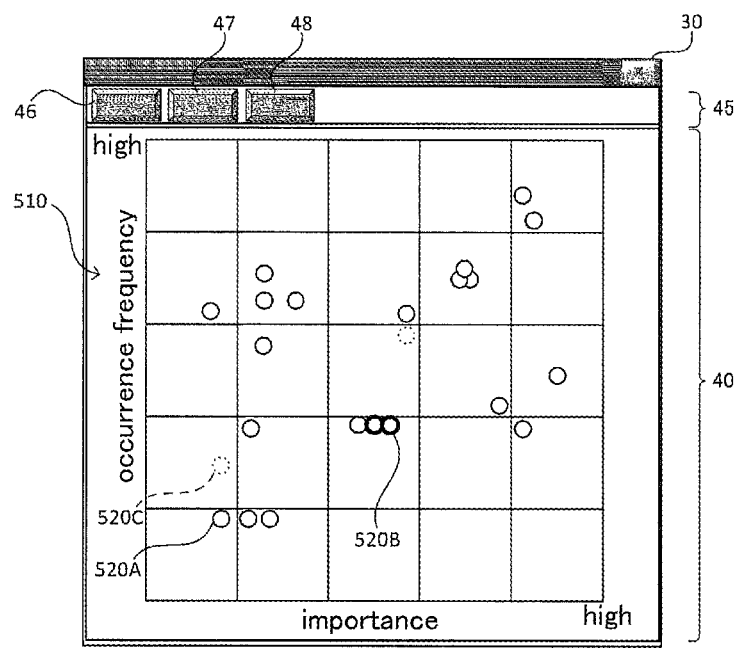
FIG. 11 is a view showing an example of a window displaying risks of processes relating to the second embodiment of the present invention.
FIG. 12 is a view showing a device risk evaluation table stored in a storage section relating to the second embodiment of the present invention.

FIG. 12 is a view showing the device risk evaluation table 900 stored in the storage unit 210. The device risk evaluation table 900 registers therein not only importances and trouble occurrence frequencies, but also the above-described operating states of the steam traps. The plot images 420A-420C and the process circles 430A-430C are determined based on the information of the operating states in this evaluation table 900.

Also, in a process risk evaluation matrix 510 shown in FIG. 11, three kinds of plot images 520 (including plot images 520A-520C) are plotted. These plot images 520 too, like the process circles 430, are displayed in different modes (thin line, heavy line, broken line) according to operating states of the steam traps constituting a same process.

2-3: Determination of Operating States of Steam Traps

The operating state of the steam trap is determined based on ultrasonic level vibration and temperature of an outer surface of the steam trap and the ambient temperature of the steam trap. These vibration and two temperatures are detected with using vibration temperature sensors. By collating detected vibration or the like with determination reference information (e.g. correlation table of trap model, temperature, vibration, steam leakage amount, etc.) to estimate a steam leakage amount, the above-described three operating states are determined.

The above-described detection of e.g. vibration of the steam trap is effected as e.g. an operator visits a site where each steam trap is installed and places a portable collector device having the above sensors into contact with this steam trap. And, the result of detection is transmitted from the collector device to a portable terminal device such as a portable personal computer. Then, the portable terminal device effects operating state determination from the detection result and transmits the result of determination to the management service device 500. The management server device 500 stores and manages the determination result in e.g. a database in correlation with the device ID of the steam trap.

Alternatively, for instance, the collector device having the sensors and the communication function can be installed with placing the sensors thereof in contact with the outer surface of the steam trap and the collector device can effect detection periodically, without intervention by a human operator. In this case, the determination result will be transmitted to the management server device 500 from the collector device via a wireless communication or the like. And, the management server device 500 can effect operating state determination of the steam trap based on the received detection result or the like and stores and manages the result of this determination in a database or the like. Incidentally, the above-described detection and the operating state determination are known techniques, so detailed explanation thereof will be omitted herein.

2-4: Flowchart

Figure 13:
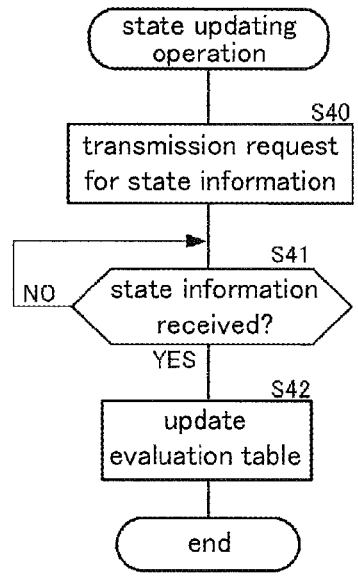
FIG. 13 is a flowchart showing an updating operation of state information executed by the risk evaluation system relating to the second embodiment of the present invention.

FIG. 13 is a flowchart showing an updating operation of state information executed by the risk evaluation system 100. This calculation operation is executed by the terminal device 200 (control unit 201). Also, this updating operation is effected once a data at a predetermined hour (time) of the day for instance.

The control unit 201 initially makes a transmission request for operating state information of steam trap to the management server device 500 (step S40) and waits until reception of this information (step S41). At the time of the transmission request, the control unit 201 transmits also the device ID's of all of the steam traps included in the device risk evaluation table 900. If information of operating state is received from the management server device 500 (step S41:YES), the control unit 201 updates the setting of the operating states included in the device risk evaluation table 900 based on the received operating state information.

Figure 14:
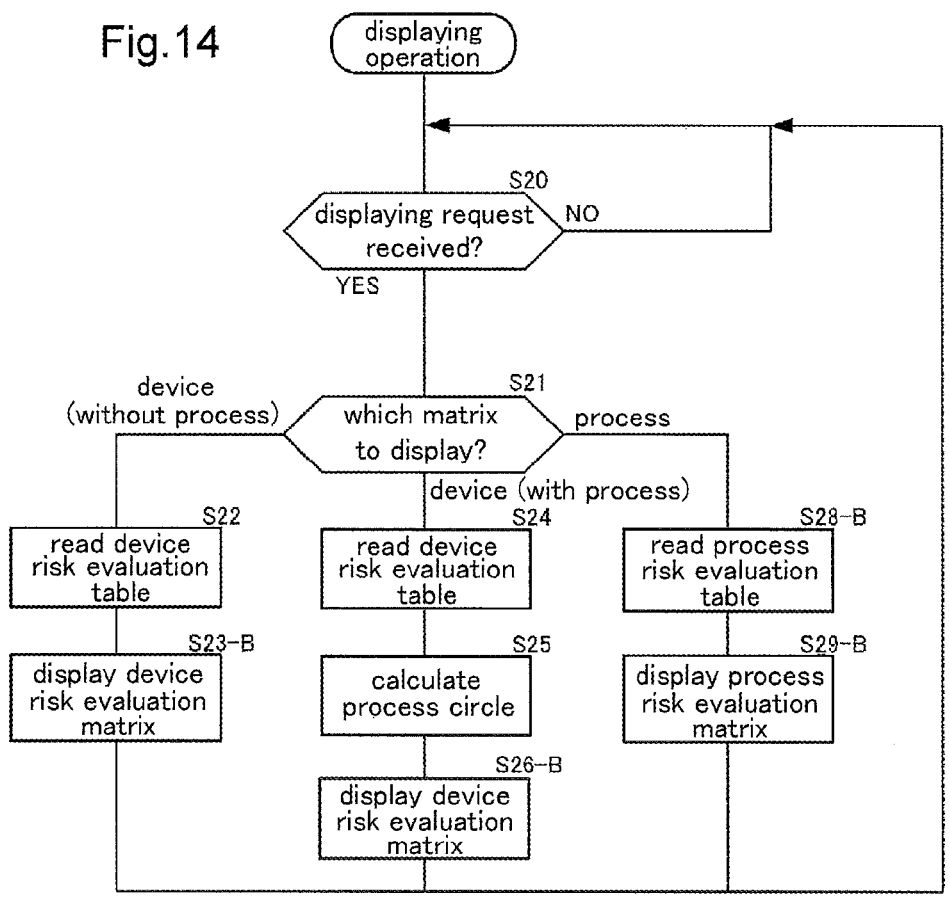
FIG. 14 is a flowchart showing a displaying operation of risk evaluation matrices executed by the risk evaluation system relating to the second embodiment of the present invention.

FIG. 14 is a flowchart showing a displaying operation of the risk evaluation matrices 410, 510 executed by the risk evaluation system 100. This displaying operation is effected by the terminal device 200 (control unit 201). This displaying operation is basically similar to the displaying operation of the first embodiment shown in FIG. 8.

The control unit 201 reads out the device risk evaluation table 900 from the storage unit 210 if the displaying mode of the risk evaluation matrix 410 (without process circle 430) is selected in the operation at step S21 (step S22). Next, based on the device risk evaluation information such as this table 900, the control unit 201 displays the device risk evaluation matrix 410 as shown in FIG. 10A (step S23-B).

Further, the control unit 201 reads out the device risk evaluation table 900 from the storage unit 210 if the displaying mode of the risk evaluation matrix 410 (with process circles 430) is selected in the operation at step S21 (step S24). Next, based on the device risk evaluation information such as this table 900, the control unit 201 calculates the center coordinates and the radius of the process circle 430 (step S25). Then, based on the device risk evaluation information such as this table 900, the control unit 201 displays the device risk evaluation matrix 410 including the process circles 430 as shown in FIG. 10B (step S26-B).

Still further, the control unit 201 reads out the device risk evaluation table 900 and the process risk evaluation table 91 from the storage unit 210 if the displaying mode of the process risk evaluation matrix 410 is selected in the operation at step S21 (step S28-B). Then, based on the process risk evaluation information such as these tables 900, 91, the control unit 201 displays the process risk evaluation matrix 510 as shown in FIG. 11 (step S29-B).

As described above, the risk evaluation system of this embodiment can achieve similar effects as those of the first embodiment. In addition, since the operating states of the specific constituent devices (steam traps) constituting a process can be grasped from the plot images, it is readily possible to identify any constituent device and process under an abnormal state. Therefore, the maintenance and management of a process system can be carried out in an even more efficient manner.

Incidentally, this embodiment, determination results of steam taps are received from the management server device 500. However, it is understood that the present invention is not limited thereto. For instance, the terminal device 200 can effect the operating state determination. In such case, the user will input the above-described detection result to the terminal device 200 and then the terminal device 200 effects operating state determination based on this inputted information or the like. Further alternatively, the user can input the determination result to the terminal device 200.

Further, in this embodiment, the steam traps are classified under the three states of a normal state, an abnormal state and a pause state. However, it is understood that the present invention is not limited thereto. The steam traps can be classified under operating states corresponding to a determination method employed.

Moreover, in this embodiment, the plot images 420A-420C, 520A-520C are not particular limited to the above-described modes (shape, color, design). Alternatively, as long as a user can identify each state, the images can be displayed with same shape, but with different blinking intervals among the respective states.

Other Embodiments

In the forgoing embodiment, the subjects of risk evaluation are steam traps. However, the invention is not particularly limited thereto, but the invention is applicable to any constituent device. Further, as for the device risk evaluation matrix too, this can display plot images of not only a single kind of constituent device, but also of a plurality of kinds of constituent device. In such case, the mode of the plot images (shape, color, design) can be same for each type. Further, the plot images are not limited to the images shown in FIG. 2A, FIG. 2B, FIG. 3, FIG. 10A, FIG. 10B, FIG. 11, but can be other images also.

Moreover, in this embodiment, the device risk evaluation matrix (with process circles/without process circles) and the process risk evaluation matrix are displayed selectively. Instead, these can be displayed together simultaneously.

Further, in this embodiment, in the device risk evaluation matrix such as the one shown in FIG. 2B, as a displaying mode allowing identification of plot images of steam traps constituting a same process, there was employed an arrangement of the plot images being surrounded by process circles. However, the invention is not particularly limited thereto. For instance, plot images in a different mode for each process can be employed. Specifically, for each process, a plot image having a different color or different design or shape can be employed. Incidentally, in case a plot image of a different shape is employed for each process, respecting an operating state of a steam trap, the plot image can have a different color for each process according to an operating state. Namely, the shape of the plot image becomes information for identifying a process whereas the color of the plot image becomes information for identifying an operating state.

Further, in the foregoing embodiment, the risk evaluation system is constituted of a terminal device and so on. However, the invention is not particularly limited thereto. For instance, the system can be constituted of a server device and a terminal device connected to a network. In this case, the server device can generate risk evaluation information for displaying the above-described device risk evaluation matrix and the terminal device can display a device risk matrix or the like based on the risk evaluation information received from the server device.

Further alternatively, the server device can store predetermined information relating to the respective steam traps (process) such as shown in FIG. 5A through FIG. 5 C and the terminal device can display a device risk evaluation matrix based on the above-described information received from the server device. In this case, the user can input in advance the predetermined information of each steam trap to the server device.

INDUSTRIAL APPLICABILITY

This invention is applicable to industrial fields of producing, selling, managing a plant (a process system) such as a power plant, an oil producing apparatus, an oil refinery, a gas plant, a chemical plant, etc.

DESCRIPTION OF REFERENCE MARKS/NUMERALS 1, 100: risk evaluation system
2, 200: terminal device
20, 201: control unit (calculation unit, risk evaluation unit)
21, 210: storage unit
22: operation unit
23: display unit
41, 410: device risk evaluation matrix
42, 420: plot image
43, 430: process circle
51, 520: process risk evaluation matrix
52, 520: plot image
90, 900; device risk evaluation table
91: process risk evaluation table

The invention claimed is:
1. A risk evaluation system for a process system constituted of a plurality of processes, the system comprising:
a storage unit that stores relevance information that correlates identification information for identifying the respective process with identification information for identifying at least a specific constituent device among constituent devices constituting the process;
an operation unit that receives an operational input of predetermined information for risk evaluation relating to the specific constituent device;
a calculation unit that calculates first and second factors for use in risk evaluation relating to the specific constituent device on the basis of the predetermined information about the specific constituent device;
a risk evaluation unit that generates device risk evaluation information to be used for displaying a device risk evaluation matrix defined by two axes of the first factor and the second factor and including a plot image plotted based on the first and second factors of the specific constituent device;
a display unit that displays the device risk evaluation matrix with using the risk evaluation information; and
the risk evaluation unit generating the device risk evaluation information in identifiable displaying mode to allow identification of the plot image of the specific constituent device constituting a same process based on the relevance information stored in the storage unit.

2. The risk evaluation system according to claim 1, wherein:
the first factor comprises importance of the specific constituent device in the process; and
the second factor comprises frequency of occurrence of a trouble in the specific constituent device.
3. The risk evaluation system according to claim 1, wherein the risk evaluation unit generates the risk evaluation information in a displaying mode that surrounds the plot images of the specific constituent devices constituting the same process with a line as the identifiable displaying mode.
4. The risk evaluation system according to claim 1, wherein:
the operation unit receives an operational input of predetermined information for risk evaluation relating to the process;
the calculation unit calculates the first and second factors of the process, based on the predetermined information relating to the process;
the risk evaluation unit generates process risk evaluation information for displaying a process risk evaluation matrix defined by two axes of the first factor and the second factor and including plot images plotted based on the calculated first and second factors of the process; and
the display unit displays the device risk evaluation matrix and the process risk evaluation matrix either selectively or together in juxtaposition with each other.
5. The risk evaluation system according to claim 1, wherein:
the storage unit further stores information of an operating state of the specific constituent device in correlation to the identification information of the specific constituent device;
the risk evaluation unit generates device risk evaluation information for displaying a device risk evaluation matrix including plot images in a displaying mode allowing identification of an operating state of each of the specific constituent devices, based on the information of the operating state of the specific constituent devices.
6. The risk evaluation system according to claim 5, wherein the displaying mode of the plot image is such that one of shape, color, blinking interval is made different according to the operating state.
7. The risk evaluation system according to claim 5, wherein:
the specific constituent device comprises a steam trap for discharging drain generated in the process system; and
the operating state comprises a state determined based on information regarding temperature and vibration of the steam trap.
8. The risk evaluation system according to claim 7, wherein the operating state of the specific constituent device includes a normal state indicating an appropriate operating state, an abnormal state indicating an abnormal operating state and a paused state indicating pausing of operation.
9. A computer program product for risk evaluation to be applied to a process system constituting of a plurality of processes, the computer program product comprising at least one non-transitory computer-readable medium including program instructions that, when executed by at least one processor, cause the at least one processor to:
calculate first and second factors for use in risk evaluation relating to at least a specific constituent device among constituent devices constituting—the process on the basis of predetermined information for risk evaluation about the specific constituent device, the predetermined information being inputted by a user via an operation unit; and generate device risk evaluation information to be used for causing a display unit to display a device risk evaluation matrix defined by two axes of the first factor and the second factor and including a plot image plotted based on the first and second factors of the specific constituent device, wherein, the device risk evaluation information is in identifiable displaying mode to allow identification of plot image of the specific constituent device constituting a same process, based on relevance information correlating identification information for identifying the process and identification information for identifying the specific constituent device.

10. A risk evaluation method for a process system constituting of a plurality of processes executed by a computer, the method comprising:

an accessing step for accessing a storage unit that stores relevance information that correlates identification information for identifying the respective process with identification information for identifying at least specific constituent device among constituent devices constituting the process;

an operating step for receiving an operational input of predetermined information for risk evaluation relating to the specific constituent device;

a calculating step for calculating first and second factors for use in risk evaluation relating to the specific constituent device on the basis of predetermined information about the specific constituent device;

a risk evaluating step for generating risk evaluation information to be used for displaying a device risk evaluation matrix defined by two axes of the first factor and the second factor and including plot images plotted based on calculated importance and trouble occurrence frequency of the specific constituent device; and a displaying step for displaying the device risk evaluation matrix with using the risk evaluation information;

wherein the risk evaluating step generates the device risk evaluation information in identifiable displaying mode to allow identification of the plot image of the specific constituent device constituting a same process based on the relevance information stored in the storage unit.

* * * * *

UNITED STATES PATENT AND TRADEMARK OFFICE
CERTIFICATE OF CORRECTION

PATENT NO.       : 10,025,658 B2
APPLICATION NO.  : 15/300909
DATED            : July 17, 2018
INVENTOR(S)      : Kenta Ihara et al.

Page 1 of 1

It is certified that error appears in the above-identified patent and that said Letters Patent is hereby corrected as shown below:

In the Claims

Column 16, Line 66, Chaim 9, delete "constituting-" and insert -- constituting --

Signed and Sealed this
Twenty-third Day of October, 2018

Andrei Iancu
*Director of the United States Patent and Trademark Office*